United States Patent [19]

Utting

[11] 4,286,155

[45] Aug. 25, 1981

[54] RADIOACTIVE GAS MONITOR

[75] Inventor: George R. Utting, Satellite Beach, Fla.

[73] Assignee: Victoreen Incorporated, Cleveland, Ohio

[21] Appl. No.: 44,195

[22] Filed: May 31, 1979

[51] Int. Cl.³ .......................... G01T 1/00; G01T 1/18
[52] U.S. Cl. ................................... 250/336; 250/252; 250/380; 250/435
[58] Field of Search ............... 250/336, 369, 374, 388, 250/389, 394, 395, 372, 380, 435, 252; 235/92 PC; 364/527

[56] References Cited

U.S. PATENT DOCUMENTS

| | | | |
|---|---|---|---|
| 2,829,269 | 4/1958 | Peacock et al. | 250/374 X |
| 2,991,365 | 7/1961 | Churchill | 250/394 |
| 3,246,150 | 4/1966 | Stoddart et al. | 250/369 |
| 3,470,365 | 9/1969 | Nather et al. | 250/336 X |
| 3,486,025 | 12/1969 | Brinkeroff et al. | 250/389 |
| 3,515,861 | 6/1970 | Nather | 364/527 X |
| 3,578,960 | 5/1971 | Georgi et al. | 250/365 X |
| 3,725,688 | 4/1973 | Brunson et al. | 235/92 PC X |
| 3,917,948 | 11/1975 | Strutz | 250/372 |
| 3,924,106 | 12/1975 | Keefe | 235/92 PC |

Primary Examiner—Davis L. Willis
Attorney, Agent, or Firm—Harness, Dickey & Pierce

[57] ABSTRACT

A radioactive gas monitor that is adapted to measure total airborne radiation activity over an extended period of time and provide a readout in units that can be directly correlated to the maximum permissible exposure standards established by the federal government. The instrument also includes automatic background count rate subtraction, as well as means for measuring the actual background radiation level and adjusting the subtracted count rate accordingly.

20 Claims, 4 Drawing Figures

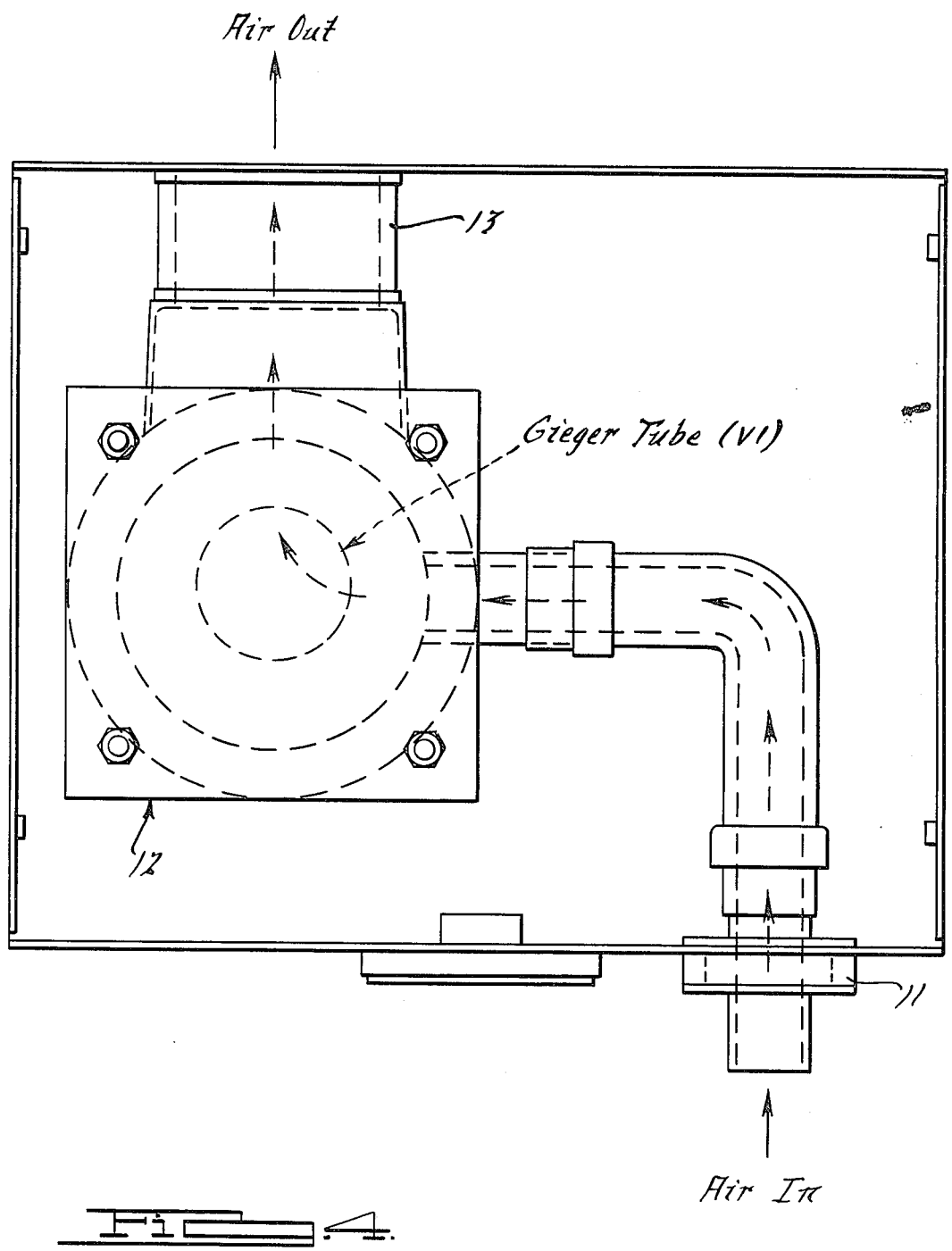

RADIOACTIVE GAS MONITOR

BACKGROUND AND SUMMARY OF THE INVENTION

The present invention relates to a radioactive gas monitoring device and in particular to a device that is capable of providing a continuous integrated readout of radioactive gas exposure.

Instruments for measuring radioactive gases are well known and widely used. However, gas monitoring instruments currently available, especially those for measuring radioactive gas concentrations in air, provide only a reading of instantaneous gas concentration. In other words, these instruments are only adapted to indicate the level of radioactive gas concentration present at the time immediately preceding the measurement. While such instruments are therefore of value in determining the existence of gross radioactive gas leakage, they do not provide precise information concerning the total accumulated radioactivity which personnel in a particular area might be exposed to over an extended period of time. Such information is particularly useful in view of the current NRC regulations governing the permissible levels of radioactive gas exposure which speak in terms of a Maximum Permissible Concentration (MPC) over a period of 40 hours, to cover individual exposure during one calendar week. Thus, the regulations do not permit exposure of more than 40 MPC-HOURS in any one week.

Accordingly, it can be appreciated that it is desirable to provide a radioactive gas monitoring instrument that is capable of measuring total integrated activity over an extended period of time. Hence, the present invention, while also indicating instantaneous radioactive gas concentrations, integrates the total exposure to provide a readout in units which can be directly correlated to MPC exposure levels established by the federal government.

As will subsequently be described in greater detail, the preferred embodiment of the present invention is adpated to measure concentrations of Xe-133 in room air or Xe-133 absorption trap effluent, although it will be appreciated that the present invention can be readily adapted to measure other radioactive gases as well. Xe-133 emits a beta particle which is detectable by a Geiger tube. Actual test chambers have shown that a Geiger tube will count at a rate of approximately 300 counts per minute when the concentration of Xe-133 is equal to $10^{-5}$ $\mu$Ci per cc, which is the MPC level for Xe-133 established by the federal government. Accordingly, it can be seen that a Geiger tube count of approximately 18,000 is equivalent to 1 MPC-HOUR.

The radioactive gas monitor of the present invention is adapted to provide a direct readout in units of MPC-HOURS by accumulating the total count from a Geiger tube and continuously dividing the result by an appropriate calibration constant. In this manner, information relating to the total airborne radioactive exposure over an extended period of time is directly provided. Moreover, the present invention includes an internal pulse generator whose output is continuously subtracted from the count output of the Geiger tube to account for the normal background count rate of a Geiger tube due to ambient radiation. In addition, the present radioactive gas monitor provides means for measuring both the actual and subtracted background count rates and adjusting the subtracted background count rate, so that the instrument can be accurately calibrated for different ambient environments. More particularly, the present instrument includes a "TEST" position in which the actual background radiation, as well as the frequency of the internal pulse generator, can be alternatively measured on an analog meter and the frequency of the pulse generator adjusted until the two are equal. The preferred form of the present invention also includes a digital timer to provide an indication of the period over which the displayed measurement was taken.

Additional objects and advantages of the present invention will become apparent from a reading of the detailed description of the preferred embodiment which makes reference to the following set of drawings in which:

BRIEF DESCRIPTION OF THE DRAWINGS

FIG. 4 is a plan view illustrating the preferred mounting arrangement of the Geiger tube.

DETAILED DESCRIPTION OF THE PREFERRED EMBODIMENT

Figure 1:
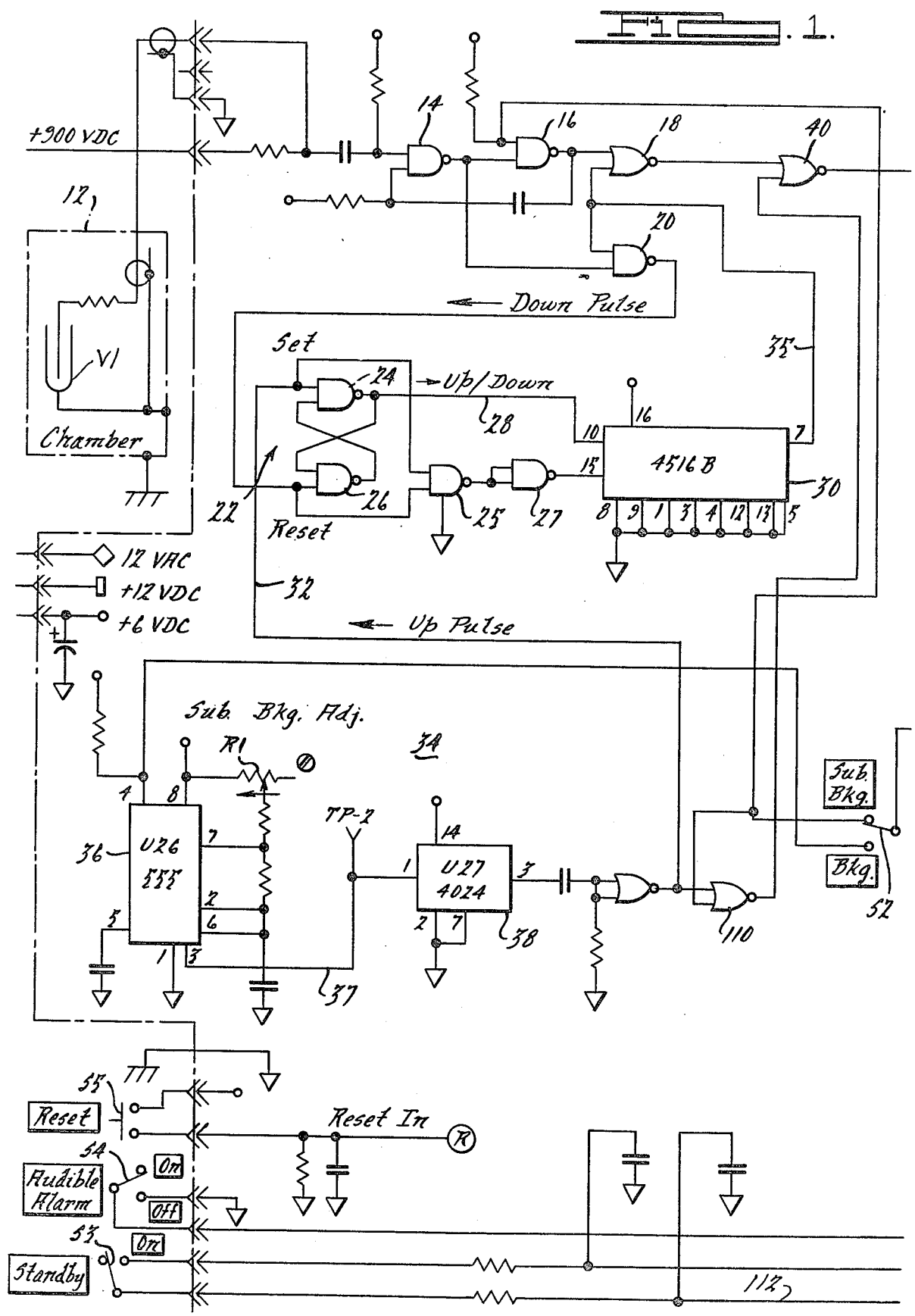
FIGS. 1–3 are a circuit diagram of a radioactive gas monitor according to the present invention.
Figure 2:
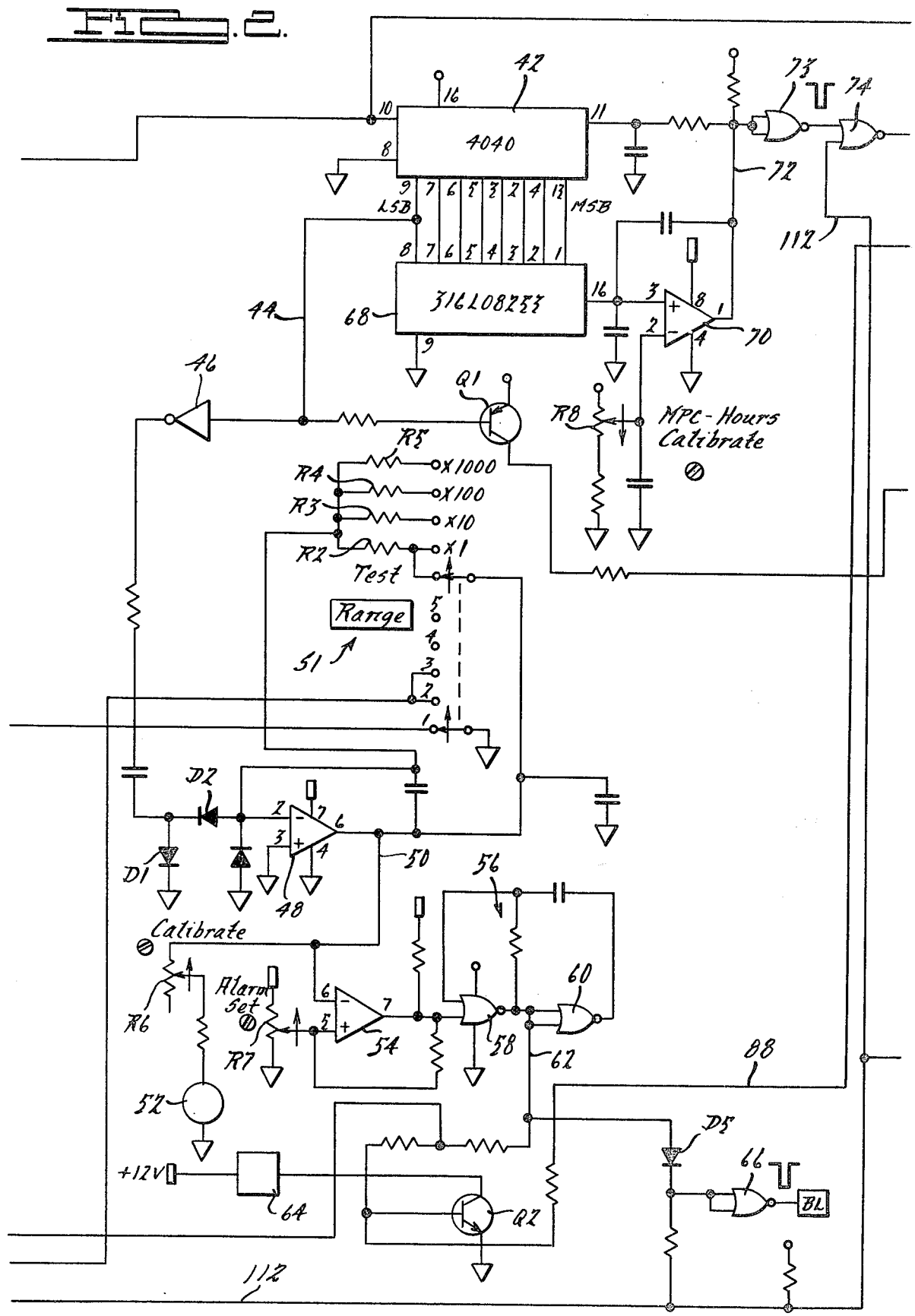
Figure 3:
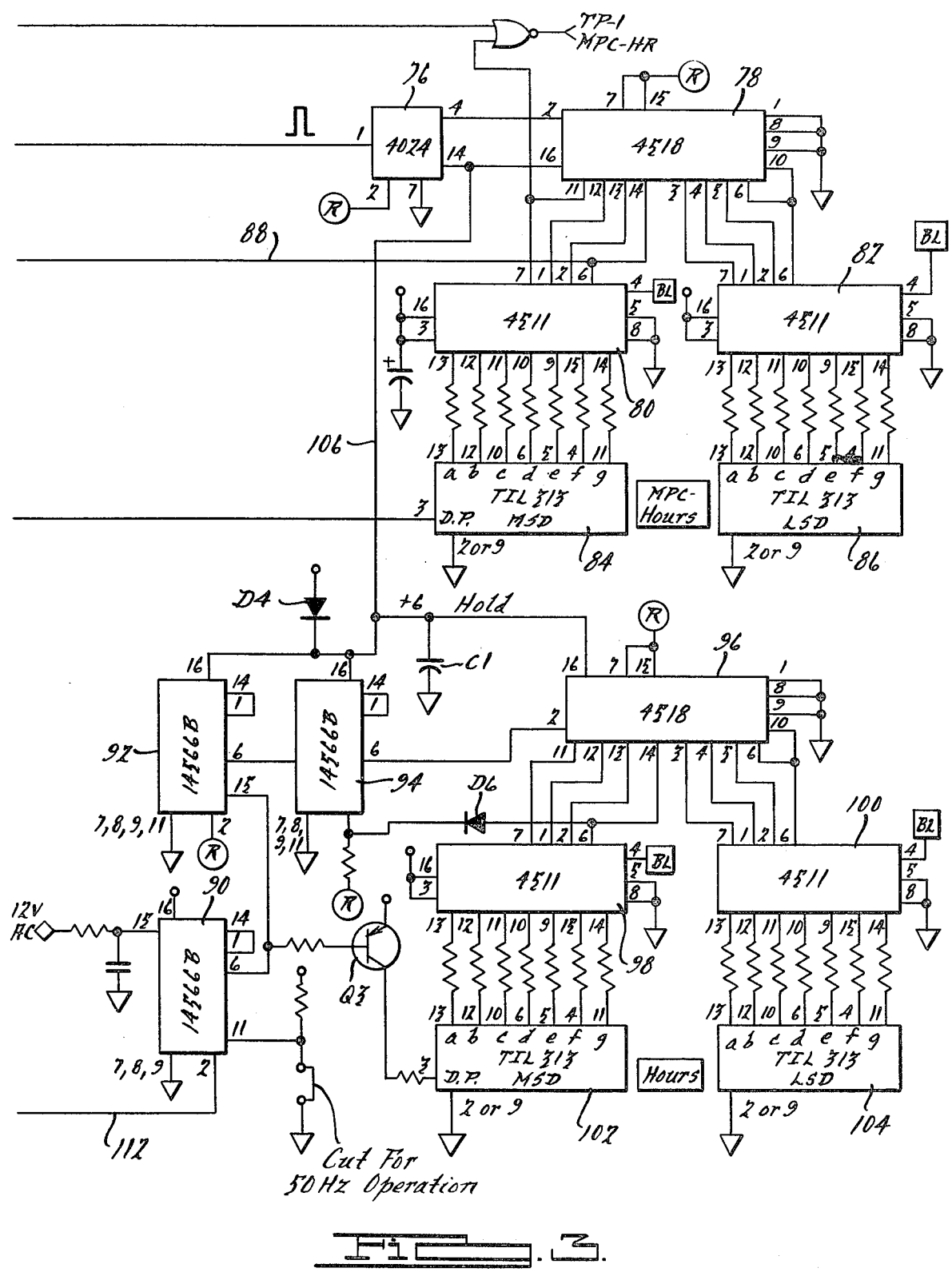

Referring to FIGS. 1–3, a circuit diagram of a radioactive gas monitor 10 according to the present invention is shown. As noted previously, the preferred embodiment of the instrument 10 described herein is used to measure concentrations of Xe-133. In particular, the instrument 10 is adapted to provide an integrated readout in units of "MPC-HOURS", where "MPC" is the Maximum Permissible Concentration of Xe-133 over a period of 40 hours, as established by the federal government. It will be appreciated, however, that the present invention is readily adapted to measure other radioactive gases such as C-14, Cr-85, A-41, and Rn-222.

The instrument 10 utilizes a pulse output radiation detector, such as a thin window, pancake-type Geiger tube V1, that is adapted to detect the beta particles emitted by Xe-133. Specifically, the Geiger tube V1 will produce an output pulse each time a beta particle is detected. Thus, the output pulse rate of the Geiger tube is directly related to the concentration of Xe-133 in the air.

Referring momentarily to FIG. 4, the Geiger tube V1 is preferably mounted in the top of a count chamber 12 so that dust and other contamination will not settle on the window of the Geiger tube V1. In addition, the count chamber 12 is shielded so that the Geiger tube V1 will measure only airborne radioactivity in a designated area. Ambient air is initially drawn into the unit through a course particulate filter 11 to remove gross dust contamination. A centrifugal blower 13 then draws the air into the shielded chamber 12 containing the Geiger tube V1. The ambient air thereafter exits out the rear of the instrument.

Returning to the circuit diagram, the Geiger tube V1 is connected to a high voltage power supply which provides the necessary 900 volts d.c. bias to the Geiger tube. The output pulses from the Geiger tube V1 are shaped by a one-shot multivibrator comprised principally of NAND-gates 14 and 16. The output of NAND-gate 14 is provided to the input of another NAND-gates 20 which has its output connected to the RESET input terminal of a SET/RESET flip-flop 22, comprised of NAND-gates 24 and 26. The Q output from flip-flop 22 on line 28 is provided to the U/D input (pin 10) of an up/down counter 30, which has its count input (pin 15) connected through an inverter 27 to the output of NAND-gate 25. The inputs of NAND-gate 25 are connected to the SET and RESET inputs of flip-flop 22. Thus, up/down counter 30 will count down one count whenever a pulse is received at the RESET input of flip-flop 22 and up one count whenever a pulse is received at the SET input of flip-flop 22.

The SET input of flip-flop 22 is also connected to the output on line 32 of a subtracted background rate generator circuit 34. Since the Geiger tube V1 has a normal background count rate due to ambient radiation, it is necessary to subtract this background count rate from the total count rate of the Geiger tube in order to derive a proper reading. This is accomplished through the use of the background rate generator circuit 34. Specifically, the background rate generator circuit 34 comprises an oscillator 36 which is adapted to generate a pulsed output signal on line 37 at a frequency that is determined by the setting of potentiometer R1. As will subsequently be described in greater detail, the potentiometer R1 provides a means of varying the subtracted background rate of the instrument 10 so that it coincides with the actual ambient background radiation of the particular location in which the instrument is operating. The oscillator output signal on line 37 is then provided through a divide-by-64 counter 38 to arrive at the final subtracted background rate signal one line 32 that is provided to the SET input of flip-flop 22.

Whenever a pulse is produced on line 32 from the background rate generator circuit 34, a HI signal is produced at the Q output of flip-flop 22 on line 28, causing the up/down counter 30 to switch to its UP counting mode. In other words, each time an "up pulse" is produced on line 32, the up/down counter 30 counts up one count. If the resulting count in the up/down counter 30 is positive, then a HI output pulse is produced on line 35 which is provided to the other input of NAND-gate 20. With NAND-gate 20 thus enabled, the Geiger count pulses from the output of NAND-gate 14 are provided to the RESET input of flip-flop 22 to thereby cause the up/down counter 30 to count downward. The up/down counter 30 will continue to count downward until it reaches zero, at which point the output signal on line 35 will go LO, thereby disabling NAND-gate 20. Thus, it can be seen that a pulse count is subtracted from the Geiger count output signal each time an UP pulse is produced on line 32 by the background rate generator circuit 34. In other words, the pulse rate of the oscillator 36, as divided by counter 38, is subtracted from the Geiger tube detector count rate.

The output of NAND-gate 16 is provided to one of the inputs of a NOR-gate 18. The other input of NOR-gate 18 is connected to the output on line 35 from the up/down counter 30. Accordingly, it can be seen that when the output signal one line 35 goes LO to disable NAND-gate 20 thereby indicating that the up/down counter 30 is in the "full down" position, NOR-gate 18 is enabled. The Geiger count signal is then provided through NOR-gate 18, as well as another NOR-gate 40, to the input (pin 10) of an eight-bit counter 42. The least significant bit (LSB) in the output of counter 42 is provided on line 44 through an inverter 46 and a diode pump circuit comprised of diodes D1 and D2, to an integrator amplifier 48. Integrator amplifier 48 is adapted to produce an analog signal at its input on line 50 whose magnitude is proportional to the "net" count rate of the Geiger tube V1. The count rate signal on line 50 is provided through a calibration resistor R6 to an analog rate meter 52. Thus, the analog rate meter 52 is adapted to provide a reading of the instantaneous gas concentration of Xe-133.

In addition, the count rate signal on line 50 is also provided to the negative input of a comparator amplifier 54 which has its positive input connected to an alarm set potentiometer R7. Potentiometer R7 is adapted to be set to a predetermined alarm level so that whenever the count rate of the Geiger tube V1, and hence the instantaneous concentration of Xe-133, exceeds the present alarm level, an output signal is produced by comparator 54 which enables an audible alarm 64. In particular, the output from comparator 54 is connected to a 1 Hz. oscillator circuit 56 comprised of NOR-gates 58 and 60. The output from the oscillator circuit 56 on line 62 is in turn provided to the base of a transistor Q2 which has its collector terminal connected to the audible alarm 64. Thus, whenever the oscillator circuit 56 is enabled by an output signal from comparator 54, the audible alarm 64 is cycled on and off once each second. In addition, the 1 Hz. output signal from oscillator circuit 56 on line 62 is also provided through a diode D5 and an inverter 66 to the enable terminals (pins 4) of the display drivers in the visual display to cause the display to blink on and off as well. In the preferred embodiment, a front panel switch S4 is provided to disable the audible alarm if desired.

At this point, it will be noted that the analog rate meter 52 is scaled in accordance with the setting of the RANGE switch S1. In particular, the position of RANGE switch S1 determines which of the four scaling resistors R2–R5 is connected across integrator 48 to scale the count rate signal on line 50 provided to meter 52. It will also be noted, however, that in the preferred embodiment MPC-HOURS and HOURS information is accumulated only when the analog rate meter 52 is in the low range; i.e., when RANGE switch S1 is connected to either scaling resistor R2 or R3. The high range positions of RANGE switch S1, using scaling resistors R4 or R5, are available only when the instrument is utilized to measure instantaneous gas concentrations on analog rate meter 52. This permits the present instrument to be utilized to measure relatively high instantaneous levels of radioactive gas activity such as might emanate from the output of a gas trap. In the two low range positions (2 and 3) of RANGE switch S1, line 112 is effectively grounded through STANDBY switch S3 and the bottom half of RANGE switch S1 (assuming STANDBY switch S3 is in the ON position). Hence, a LO logic signal is provided to both the reset terminal (pin 2) of counter 90 which controls the HOURS display and to one of the inputs of NOR-gate 74 which controls the MPC-HOURS display. Accordingly, both MPC-HOURS and HOURS information will be accumulated. However, when RANGE switch S1 is in either of the two high range positions (4 and 5), the signal on line 112 will go HI, thereby disabling both the MPC-HOURS and HOURS displays, and thus permitting the measurement of high instantaneous levels of radiation activity.

The eight-bit parallel output from counter 42 is provided to a digital-to-analog converter 68 which has its analog output at pin 16 provided to the positive input of a comparator amplifier 70. The negative or reference input of comparator amplifier 70 is connected to an MPC-HOURS calibration resistor R8. Thus, when the accumulated count in counter 42 attains a predetermined level such that the analog output from digital-to-analog converter 68 exceeds the level of the reference signal provided to the negative input of comparator 70 as determined by the setting of resistor R8, an output signal is produced on line 72 which resets counter 42. In addition, the output signal on line 72 from comparator amplifier 70 is provided through an inverter 73 and NOR-gate 74 to the input of a divide-by-128 counter circuit 76. Thus, it can be seen that counter 76 counts one count each time counter 42 is reset.

The effect of the two counters 42 and 76 is to divide the total net count of the Geiger tube V1 by a calibration factor, herein approximately 18,000, to provide the desired MPC-HOURS units. It will be appreciated, therefore, that D-to-A converter 68, comparator amplifier 70 and potentiometer R8 provide a means of varying this calibration factor by varying the count total which counter 42 must attain before being reset. This of course varies the divide-by-factor of the counter 42. The purpose of the adjustable calibration feature is to permit the instrument 10 to be accurately calibrated, given the geometry of the chamber 12, the thickness of the window of the Geiger tube V1, as well as the characteristics of the Geiger tube itself.

The output from counter 76 is provided to a two-decade BCD counter 78 which accumulates MPC-HOURS information. The two sets of parallel outputs from BCD counter 78 are provided to a pair of display drivers 80 and 82 which in turn drive two seven-segment LED digital displays 84 and 86, respectively. The MSB (pin 14) in the most significant digit in the output of BCD counter 78 is connected via line 88 to the base of transistor Q2 so that the audible alarm 64 is activated to provide an emergency warning at 80 MPC-HOURS of accumulated radioactive exposure.

The HOURS information is accumulated in the following manner. A 60 Hz. a.c. signal is provided to a divide-by-sixty counter 90 which has its output connected to another divide-by-sixty counter 92, which in turn has its output connected to a third divide-by-sixty counter 94. Accordingly, it will be appreciated that the output of counter 94 comprises an HOURS count. The HOURS count output from counter 94 is provided to another two-decade BCD counter 96 which has its parallel outputs connected to a pair of display drivers 98 and 100, which in turn drive seven-segment LED digital displays 102 and 104, respectively. A diode D6 is preferably tied to output pin 14 of BCD counter 96 to shut off the HOURS display at 80 hours.

In order to provide the operator with a visual indication that MPC-HOURS information is being accumulated, the least significant bit (LSB) from the output of counter 42 on line 44 is connected to the base of a transistor Q1 which has it collector connected to pin 3 of one of the LED digital displays 84 in the MPC-HOURS display. In this manner the LED digital display 84 will blink on and off for every other count of counter 42. In a like manner, when HOURS information is being accumulated, the 1 Hz. output signal from counter 90 is provided to the base of another transistor Q3 which has it collector connected to pin 3 of the LED digital display 102 in the HOURS display. Thus, the LED display 102 will similarly flash on and off once each second whenever HOURS information is being accumulated.

Additionally, the preferred embodiment of the present invention includes a front panel mounted STANDBY switch S3 which is provided to allow the operator of the instrument to discontinue further accumulation of MPC-HOURS and HOURS information while maintaining the current accumulated readings. Specifically, when STANDBY switch S3 is in the standby mode, a HI signal results on line 112 which as previously explained terminates the further accumulation of MPC-HOURS and HOURS information by disabling NOR-gate 74, which blocks the transmission of count signals to counter 76, and by maintaining counter 90 in the reset mode. Thus, the STANDBY switch S3 can be utilized to suspend operation of the instrument during non-working hours, for example, so that total radiation activity is compiled only when personnel are present in the area being monitored. In this manner, total exposure levels of radiation over an extended period such as a 40-hour work week, can be accurately documented.

Finally, it will be noted that the present instrument 10 provides a convenient means of measuring actual background radiation so that the subtracted background count rate generator 34 can be adjusted accordingly. In particular, the first position of RANGE switch S1 is utilized as a TEST position. When the RANGE switch S1 is switched to the TEST position, switch S2 is activated. The position of switch S2 in turn determines whether the analog rate meter 52 will read the actual background radiation level as measured by the Geiger tube V1 or the subtracted background rate from generator circuit 34. Specifically, when switch S2 is in the BKG position, oscillator 36 in the subtracted background rate generator circuit 34 is disabled. In addition, the signal at input pin 2 of NOR-gate 110 is HI, thereby disabling NOR-gate 110 and blocking the transmission of the output signal from the subtracted background rate generator 34 on line 32. As a result, the output signal from NOR-gate 110, and hence the input signal to pin 2 of NOR-gate 40, is maintained LO thereby permitting the passage through NOR-gate 40 of the Geiger count rate output signal to the input of counter 42. Thus, it will be appreciated that when switch S2 is in the BKG position, the analog rate meter 52 will read the actual background count rate as measured by the Geiger tube V1.

When the switch S2 is in the SUB-BKG position, the signal at input pin 2 of NOR-gate 110 is maintained LO, thereby permitting the passage of the subtracted background rate signal on line 32 from the output of generator 34. Moreover, the input signal to pin 2 of NAND-gate 16 is also LO, thereby disabling NAND-gate 16 (one-shot) and blocking the transmission of the count rate output signal from the Geiger tube V1. As a result, the output of NAND-gate 16 is HI which renders the output of NOR-gate 18 LO. This in turn enables NOR-gate 40 by maintaining the signal at its input pin 1 LO, thus permitting the transmission of the subtracted background rate signal from the output of NOR-gate 110 to the input of counter 42. Accordingly, it will be appreciated that when switch S2 is in the SUB-BKG position, the analog rate meter 52 will read the subtracted background rate signal generated by the background rate generator circuit 34.

Thus, it can be seen that when the RANGE switch S1 is in the TEST position, the subtracted background rate signal on line 32 can be readily compared with the actual background radiation count rate. This then permits the frequency of the subtracted background rate signal to be accurately adjusted by varying the setting of potentiometer R1 until the two rate signals are equal.

As a further convenience feature, a capacitor C1 is preferably provided in the digital display network (FIG. 3) for the purpose of insuring that in the event of a short-term power failure, sufficient power will be supplied to the integrated circuits to hold the accumulated MPC-HOURS and HOURS information. During normal circuit operation, capacitor C1 is maintained in a fully charged condition by diode D4.

While the above description constitutes the preferred embodiment of the present invention, it will be appreciated that the invention is susceptible to modification, variation and change without departing from proper scope or fair meaning of the accompanying claims.

What is claimed is:

1. A radioactive gas monitoring device for measuring the total airborne radiation activity in a designated area over an extended period of time and providing a direct readout of said measurement in predefined integrated units, including:
  a detector for detecting radioactive gas and producing a first pulsed output signal at a frequency that is proportional to the concentration of said radioactive gas;
  conversion means for converting said first pulsed output signal to a converted signal by dividing the frequency of said first pulsed output signal by a predetermined conversion factor so that each converted signal pulse corresponds to one of said integrated units, said conversion means including a first digital counter, a digital-to-analog converter for converting the digital output of said first digital counter to an analog signal, a comparator for comparing said analog signal to a reference signal and producing an output signal whenever the value of said analog signal is greater than the value of said reference signal, and calibration means for adjusting said predetermined conversion factor by adjusting the value of said reference signal;
  accumulator means for continuously accumulating the total number of converted signal pulses produced by said conversion means over the entire extended measurement period; and
  display means for displaying in said integrated units the total number of accumulated converted signal pulses.

2. The radioactive gas monitoring device of claim 1 further including background rate means for producing a second pulsed output signal at a frequency that is proportional to the level of normal background radiation present in said designated area, and subtraction means connected between said detector and said conversion means for continuously subtracting said second pulsed output signal from said first pulsed output signal.

3. The radioactive gas monitoring device of claim 2 further including rate means for producing a rate signal proportional to the frequency of said first pulsed output signal and second display means for displaying the instantaneous radioactive gas concentration present in said designated area by providing a readout of said rate signal.

4. The radioactive gas monitoring device of claim 3 wherein said background rate means includes adjustment means for varying the frequency of said second pulsed output signal.

5. The radioactive gas monitoring device of claim 4 further including testing means for selectively providing to said rate means for display by said second display means either said first pulsed output signal or said second pulsed output signal.

6. The radioactive gas monitoring device of claim 1 further including timing means for timing the period over which said measurement is taken.

7. The radioactive gas monitoring device of claim 1 wherein the output signal produced by said comparator is provided to said first digital counter to reset said counter.

8. A radioactive gas monitoring device for measuring the total airborne radiation activity in a designated area over an extended period of time and providing a direct readout of said measurement in MPC-HOUR units, including:
  a detector for detecting radioactive gas and producing a first pulsed output at a frequency that is proportional to the concentration of said radioactive gas;
  conversion means for dividing the frequency of said first pulsed output signal by a conversion factor corresponding to the number of pulses that would be produced by said detector in one hour if the level of radioactive gas concentration in said designated area was equal to the maximum permissible concentration (MPC) level, so that each pulse of said converted signal corresponds to one MPC-HOUR;
  accumulator means for continuously accumulating the pulses in said converted signal; and
  display means for displaying in MPC-HOUR units the total number of accumulated pulses.

9. The radioactive gas monitoring device of claim 1 or 8 further including standby means for inhibiting said accumulator means from the further accumulation of pulses without destroying the information already accumulated in said accumulator means.

10. The radioactive gas monitoring device of claim 9 wherein said standby means includes gating means connected between said conversion means and said accumulator means for blocking the transmission of said converted signal to said accumulator means in response to the receipt of an inhibit signal.

11. The radioactive gas monitoring device of claim 10 wherein said standby means further includes manually operable switch means for producing said inhibit signal.

12. The radioactive gas monitoring device of claim 8 wherein said conversion means includes calibration means for adjusting said predetermined conversion factor.

13. The radioactive gas monitoring device of claim 12 wherein said conversion means further includes a first digital counter, a digital-to-analog converter for converting the digital output of said first digital counter to an analog signal, and a comparator for comparing said analog signal to a reference signal and producing a reset signal whenever the value of said analog signal is greater than the value of said reference signal; said reset signal being provided to said first digital counter to reset said counter.

14. The radioactive gas monitoring device of claim 13 wherein said calibration means is adapted to adjust the value of said reference signal.

15. A radioactive gas monitoring device for measuring the total airborne radiation activity in a designated area over an extended period of time, including:
  detector means for detecting radioactive gas and producing a detector output signal in accordance with the level of radioactive gas concentration in said designated area;

accumulator means for continuously accumulating the information from said detector output signal including storage means for storing said accumulated information;

display means for displaying said accumulated information; and standby means for suspending the further accumulation of information by said accumulator means without destroying the accumulated information in said storage means.

16. The radioactive gas monitoring device of claim 15 further including background compensation means for producing a second output signal in accordance with the level of background radiation in said designated area and subtracting said second output signal from said detector output signal.

17. The radioactive gas monitoring device of claim 15 further including timing means for timing the period over which said measurement is taken.

18. The radioactive gas monitoring device of claim 17 wherein said standby means is further adapted to inhibit said timing means so that said timing means only times the periods during which information is being accumulated by said accumulator means.

19. The radioactive gas monitoring device of claim 15 further including signaling means for causing said display means to produce a visual signal whenever information is being accumulated by said accumulator means.

20. The radioactive gas monitoring device of claim 19 wherein said display means includes a display element that is blinked on and off in response to said signaling means.

* * * * *